Sept. 14, 1954  G. L. CLAYBOURN ET AL  2,689,293
DRAWOUT SWITCHGEAR APPARATUS
Filed Feb. 8, 1951  3 Sheets-Sheet 1
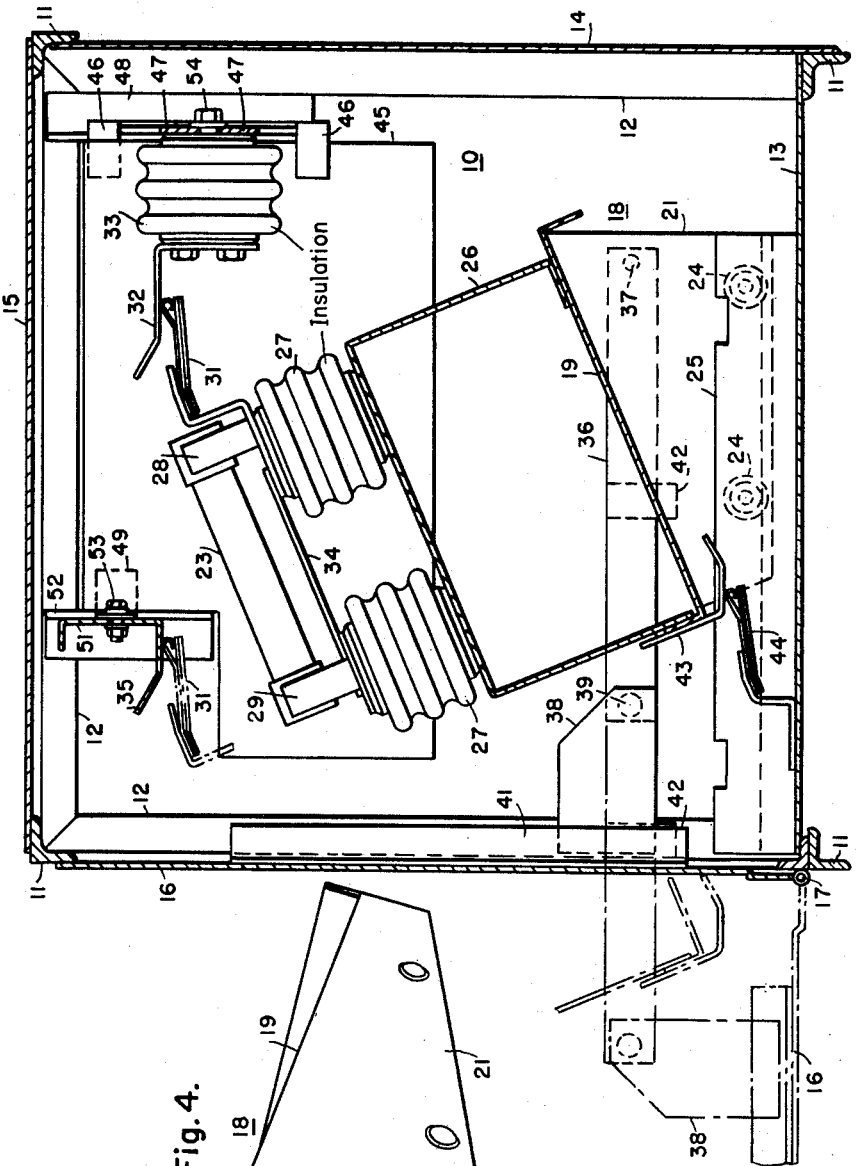
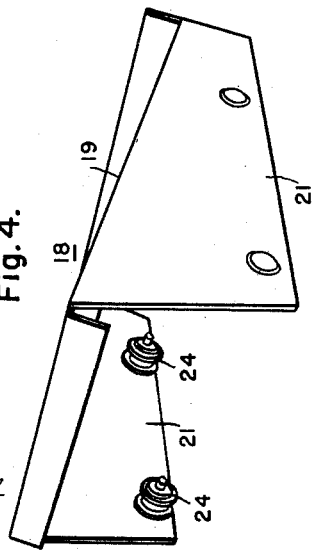
WITNESSES:
INVENTORS
Glen L. Claybourn
and Arthur L. Fletcher.
BY
ATTORNEY Sept. 14, 1954   G. L. CLAYBOURN ET AL   2,689,293
DRAWOUT SWITCHGEAR APPARATUS
Filed Feb. 8, 1951   3 Sheets-Sheet 2
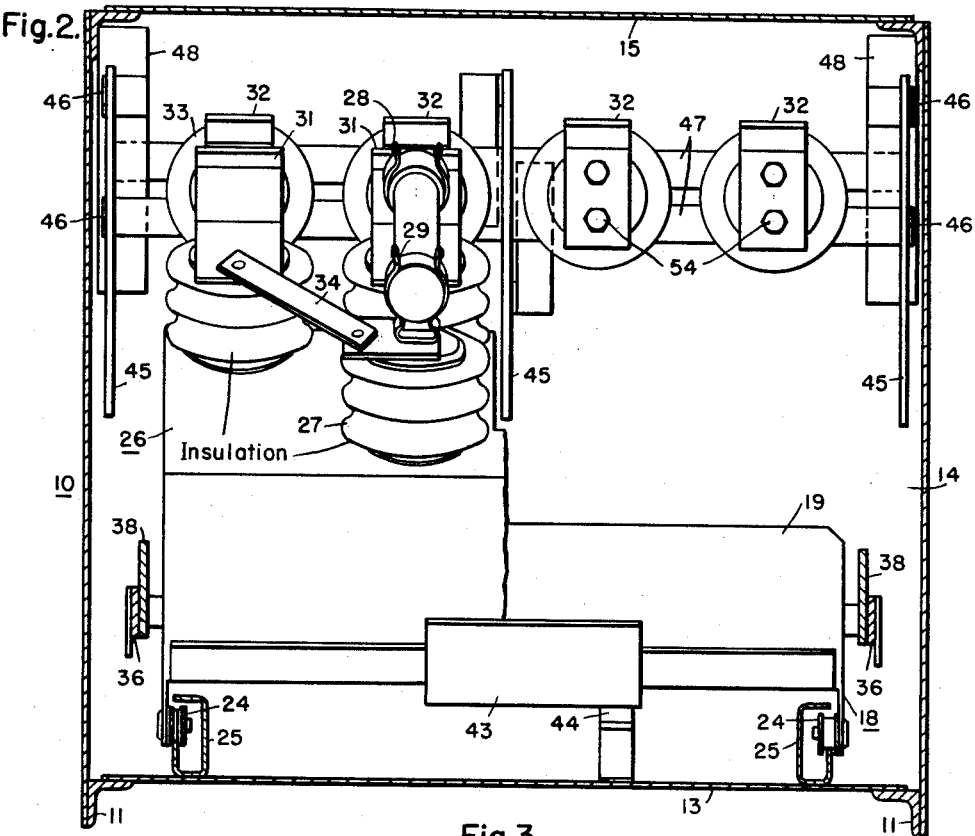
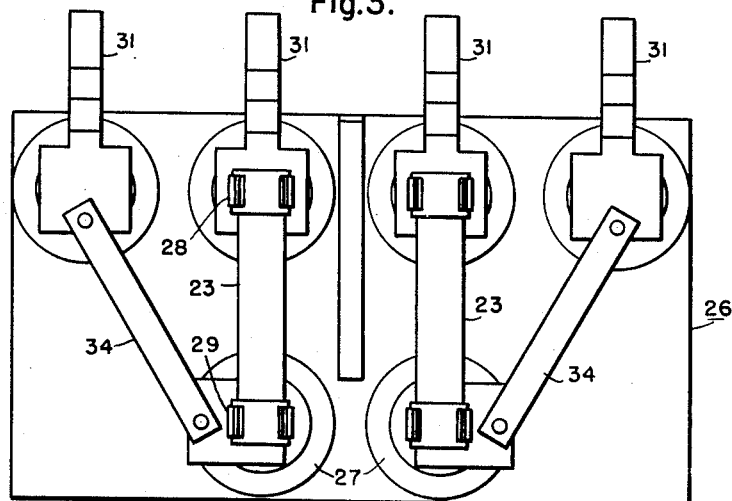
WITNESSES:
INVENTORS
Glen L. Claybourn
and Arthur L. Fletcher.
BY
ATTORNEY Sept. 14, 1954 G. L. CLAYBOURN ET AL 2,689,293
DRAWOUT SWITCHGEAR APPARATUS
Filed Feb. 8, 1951 3 Sheets-Sheet 3

WITNESSES:

INVENTORS
Glen L. Claybourn
and Arthur L. Fletcher.
BY
ATTORNEY

Patented Sept. 14, 1954

2,689,293

UNITED STATES PATENT OFFICE 2,689,293

DRAWOUT SWITCHGEAR APPARATUS

Glen L. Claybourn and Arthur L. Fletcher, Pittsburgh, Pa., assignors to Westinghouse Electric Corporation, East Pittsburgh, Pa., a corporation of Pennsylvania Application February 8, 1951, Serial No. 210,066

8 Claims. (Cl. 200—168)

Our invention relates, generally, to switchgear apparatus and, more particularly, to metal-enclosed switchgear of the drawout type wherein apparatus units are withdrawable horizontally from the housings in which they are enclosed.

An object of our invention, generally stated, is to provide metal-enclosed switchgear which shall be simple and efficient in operation and which may be economically manufactured and installed.

A more specific object of our invention is to provide a metal-enclosed switchgear structure capable of housing drawout apparatus units of different types and sizes, such as, for example, either drawout potential transformers or disconnecting fuses.

Another object of our invention is to simplify the structure of the movable member utilized to support the apparatus unit in the switchgear housing.

A further object of our invention is to provide a simplified linkage for withdrawing or inserting the movable member upon opening or closing the door of the compartment for the apparatus unit.

Still another object of our invention is to provide adjustable mounting means for the main contact insulators and barriers in the housing for a drawout apparatus unit.

A still further object of our invention is to provide a combined barrier support and grounding contact member in a switchgear housing structure.

Other objects of our invention will be explained fully hereinafter or will be apparent to those skilled in the art.

In accordance with our invention, a one-piece base or chassis for a drawout switchgear unit is mounted upon rollers which run upon rails at the sides of a housing. An adapter is provided to permit the same base to be utilized for either potential transformers or disconnecting fuses. The base is connected to a hinged door by links which move the base in or out as the door is closed or opened. The links also function as stops to limit the movement of the door and the base or chassis. The main contact insulators and barriers are adjustably mounted on bars disposed horizontally within the housing.

For a better understanding of the nature and objects of our invention, reference may be had to the following detailed description, taken in conjunction with the accompanying drawings, in which:

Figure 1 is a view, partly in side elevation and partly in section, of a drawout fuse structure embodying the principal features of our invention;

Fig. 2 is a view, partly in front elevation and partly in section, of the structure shown in Fig. 1;

Fig. 3 is a view, in plan, of a portion of the structure shown in Figs. 1 and 2;

Fig. 4 is a view, in perspective, of the drawout base or chassis;

Figures 5, 6:
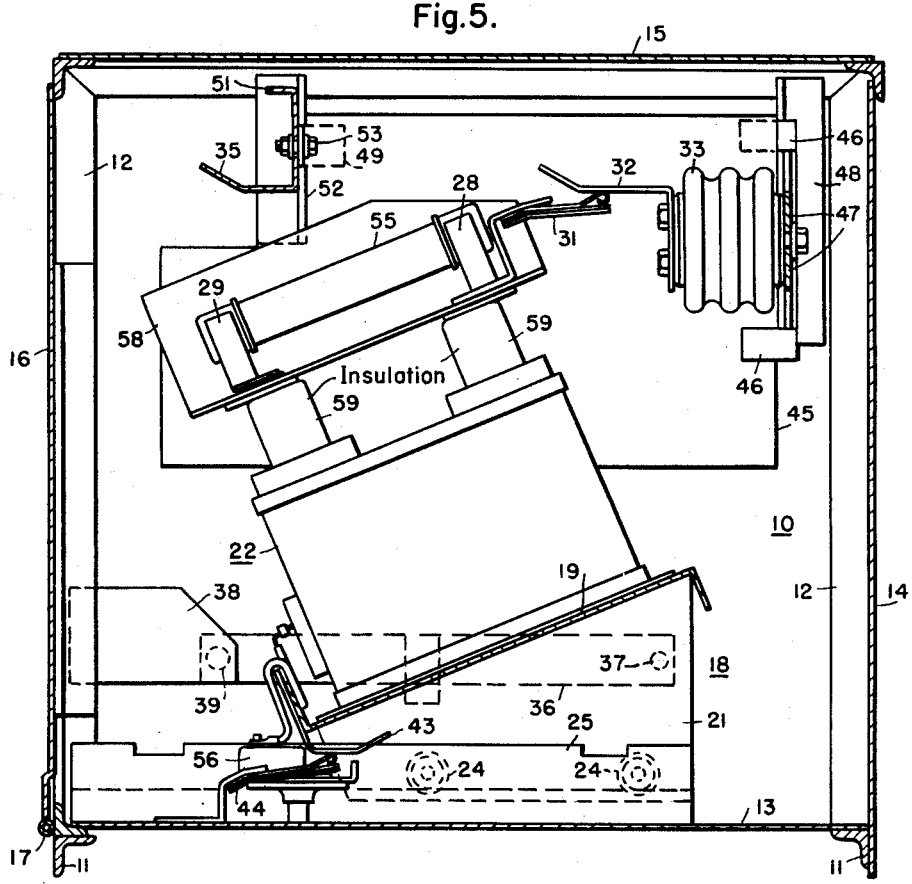
Fig. 5 is a view, similar to Fig. 1, of a drawout potential transformer structure.
Fig. 6 is an enlarged detail view of one of the secondary circuit connections for the potential transformer.

Referring to the drawings, and particularly to Figure 1, the structure shown therein comprises a housing 10 which may be of the type utilized in metal-enclosed switchgear. As shown, the housing 10 comprises angle members 11 and 12, a bottom 13, a rear wall 14, a top 15 and side plates (not shown). A door 16 is provided at the front of the housing and is supported at its bottom by a hinge 17.

As is well known, it is customary to provide potential transformers for reducing the voltage applied to the instruments and relays utilized in connection with power systems. It is also customary to provide disconnecting fuses for protecting certain circuits in the power systems. Since the terminals of the potential transformers and the disconnecting fuses are necessarily connected to relatively high voltage circuits, it is desirable to mount the transformers and the disconnecting fuses in closed housings such as the one herein described. In order to permit the transformers and the fuses to be readily inspected, it is desirable to provide for withdrawing the transformers and the fuses from within the housings to a position where they may be easily inspected.

Potential transformers and disconnecting fuses of the drawout type have been utilized heretofore. However, the mountings for the transformers and the fuses, as well as the drawout mechanisms, have been somewhat complicated. Furthermore, the mountings for the transformers have been different from the mountings for disconnecting fuses, thereby increasing the number of parts required in the manufacture of the apparatus, and hence increasing the cost of manufacturing and assembling the apparatus.

As explained hereinbefore, one of the objects of the present invention is to simplify the structure of and reduce the number of parts required for manufacturing switchgear apparatus of the drawout type.

As shown most clearly in Fig. 4, a base 18 having an inclined top 19 and depending sides 21 which are formed integrally with the top 19 is provided for supporting either a potential transformer 22, as shown in Fig. 5, or disconnecting fuses 23, as shown in Fig. 1. The base 18 is provided with rollers 24 which run on rails 25 mounted on the bottom 13 of the housing as shown most clearly in Fig. 2.

In order that the same base and drawout mechanism may be utilized for supporting either a potential transformer such as the transformer 22 shown in Fig. 5, or disconnecting fuses, such as the fuses 23 shown in Fig. 1, an adapter 26 is provided and mounted on top of the base 18 when it is desired to utilize the base to support disconnecting fuses. As shown in Fig. 1, the adapter 26 may be attached to the base 18 and the insulators 27 may be mounted on top of the adapter 26 for supporting fuse terminals 28 and 29. The terminal 28 may be electrically connected to a contact member 31 which moves with the base 18 and is disposed to engage a cooperating contact member 32 which is supported by an insulator 33 mounted in the housing 10. The contact member 32 may be connected to a power conductor (not shown).

As shown most clearly in Figs. 2 and 3, the fuse terminal 29 may be electrically connected through a conductor 34 to another contact member 31 which in turn engages another contact member 32 in the housing, thereby completing an electrical circuit through the fuse 23. As shown most clearly in Fig. 3, provision may be made for mounting two fuses 23 on one adapter 26 and one base 18. Thus, two circuits may be protected by one fuse in each circuit, or if desired, each conductor of the same circuit may be protected by a fuse 23.

As shown in Fig. 1, the base 18 may be withdrawn to a position in which the contact member 31 is disengaged from the contact member 32 and engages a grounding contact member 35, thereby grounding the high potential terminal 28 and making it safe for an operator to inspect or remove the fuse 23. The withdrawing of the base 18 from the housing is done automatically as the door 16 of the housing is opened.

As shown in Figs. 1 and 2, a link or bar 36 has one end pivotally connected to a side 21 of the base 18 by a pin 37 and the other end pivotally connected to a plate 38 by a pin 39. The plate 38 extends inwardly from the door 16 when the door is closed and is attached to an angle member 41 which, in turn, is secured to the door 16. As indicated by the broken lines in Fig. 1, the plate 38 moves to a vertical position when the door 16 is opened, thereby withdrawing the base 18 from the housing by means of the links 36, it being understood that similar plates 38 and links 36 are provided for each side of the base 18.

A stop member 42 is secured to each link 36, and these members are so disposed that they engage the vertical angle members 12 at the front corners of the housing 10 when the door 16 is in a horizontal position. Thus, the stop members 42 limit the outward travel of the base 18 and the links 36 and the plates 38 support the door 16 in a horizontal position when it is opened. When the door 16 is closed, the base 18 is automatically moved into the housing to cause the contact members 31 to engage the contact members 32. As shown in Fig. 1, a grounding contact member 43, which is carried by the base 18, engages a grounding contact member 44 in the housing 10 when the base 18 is fully inserted into the housing.

As also shown in Figs. 1 and 2, phase barriers 45 may be adjustably mounted in the housing 10. The rear end of each phase barrier 45 is supported by clips 46 which are adjustably attached to spaced bars 47 which, in turn, are attached to angle members 48 in the housing 10. The front end of each barrier 45 is supported by a clip 49 which is adjustably attached to the grounding bar 35 and an angle bar 51 which, in turn, are attached to angle member 52 in the housing 10. The clip 49 is attached to the bars 35 and 51 by a bolt 53 which is disposed in the opening between the bars 51 and 35. Likewise, the clips 46 are attached to the bars 47 by bolts 54 which are disposed in the opening between the two spaced bars 47. Thus, the barriers may be adjusted horizontally in the housing to properly space the barriers for different arrangements of the disconnecting fuses 23.

Likewise, the contact members 32 may be adjusted horizontally at right angles to the line of movement of the base 18 since the insulators 33 are adjustably attached to the bars 47 by bolts 54 in a manner similar to that in which the barriers are attached to the bars 47. Thus, the same base and the same housing construction may be utilized for fuses of different sizes and for different arrangements of the fuses.

As shown in Fig. 5, the same base 18 may be utilized for supporting the potential transformer 22 in the housing 10. As shown, the potential transformer 22 is mounted directly on the top surface of the base 18. The potential transformer is provided with fuse terminals 28 and 29 in which a protective fuse 55 may be inserted. Contact members 31 carried by the potential transformer 22 are disposed to engage contact members 32 in the housing in the manner hereinbefore described, thereby connecting the primary winding of the transformer to the power conductors. The contact member 31 engages the grounding contact member 35 in the manner hereinbefore described when the door 16 is opened to withdraw the base 18 from the housing. Likewise, the grounding contact member 43 engages the grounding contact member 44 when the base 18 is fully inserted into the housing.

It will be noted that the adapter 26 previously described in connection with the disconnecting fuses 23 is of such a height that the adapter and the transformer 22 are interchangeable on the base 18, thereby spacing the contact members 31 at a predetermined distance from the base 18. In this manner, the same base and the same housing construction may be utilized for either potential transformers or disconnecting fuses.

As shown in Figs. 5 and 6, secondary contact members 56, which are carried by the base 18, are disposed to engage cooperating contact members 57, which are mounted on the bottom 13 of the housing, when the base is fully inserted into the housing. In this manner the secondary winding of the transformer may be electrically connected to conductors (not shown) which are connected to the contact members 57.

The phase barriers 45 are adjustably mounted in the housing in the manner hereinbefore described. Likewise the contact members 32 are adjustably mounted, thereby making it possible to use the same base and the same housing construction for transformers of different sizes and ratings. As shown in Fig. 5, protective barriers 58 may be disposed between the high potential terminals of the transformer 22. These barriers may be mounted on top of insulating terminals 59 which support the high potential terminals 28 and 29 of the transformer.

From the foregoing description, it is apparent that we have provided a simplified switch-gear structure which makes it possible to mount apparatus of different types in the same housing and on the same chassis or base which is of the drawout type. We have also provided a simplified drawout mechanism for the base, which mechanism also functions as a support for the door of the housing when the door is opened. The present structure requires a minimum number of simplified parts, thereby reducing the cost of manufacturing and assembling the structure.

Since numerous changes may be made in the above described construction and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. In a switchgear structure, in combination, a housing comprising vertically and horizontally disposed members, said housing having rails disposed horizontally therein, a base comprising a top and depending sides formed integrally therewith, said sides movably supporting the base on the rails, a door hinged on one of the horizontal members of the housing, a plate extending inwardly from the door and rigidly secured thereto, a link connecting the plate to one of the sides of the base to move the base into or out of the housing by closing or opening the door, and stop means secured to the link to engage one of the vertical members at the side of the housing to limit the outward movement of the base, said stop means also limiting the opening movement of the door, a stationary contact member disposed in the housing a predetermined distance above the top of the base, a generally rectangularly shaped supporting member mounted on top of the base for supporting an electrical device, an electrical contact member carried by said supporting member, said contact member on the supporting member being on a level with the stationary contact member in the housing, a pair of spaced bars disposed horizontally at the rear of the housing, said stationary contact member being adjustable horizontally between said bars at right angles to the line of movement of the electrical contact member, and an insulating barrier adjustably supported by said bars.

2. In a switchgear structure, in combination, a housing comprising vertically and horizontally disposed members, said housing having rails disposed horizontally therein, a base comprising a top and depending sides formed integrally therewith, said sides movably supporting the base on the rails, a door hinged on one of the horizontal members of the housing, a plate extending inwardly from the door and rigidly secured thereto, a link connecting the plate to one of the sides of the base to move the base into or out of the housing by closing or opening the door, and stop means secured to the link to engage one of the vertical members at the side of the housing to limit the outward movement of the base, said stop means also limiting the opening movement of the door, a stationary contact member disposed in the housing a predetermined distance above the top of the base, a generally rectangularly shaped supporting member mounted on top of the base for supporting an electrical device, an electrical contact member carried by said supporting member, said contact member on the supporting member being on a level with the stationary contact member in the housing, mounting means horizontally disposed in the housing for the stationary contact member, said stationary contact member being adjustable horizontally on said mounting means at right angles to the line of movement of the electrical contact member, and a grounding contact bar disposed in the line of movement of the electrical contact member carried by the supporting member.

3. In a switchgear structure, in combination, a sheet metal housing, said housing having rails disposed horizontally therein, a base comprising a top and depending sides formed integrally therewith, said sides movably supporting the base on the rails, a stationary contact member disposed in the housing a predetermined distance above the top of said base, a generally rectangularly shaped supporting member mounted on top of the base for supporting an electrical device, an electrical contact member carried by said supporting member, said contact member on the supporting member being on a level with the stationary contact member in the housing, said stationary contact member being adjustable horizontally at right angles to the line of movement of the electrical contact members, and a grounding contact bar disposed in the line of movement of the electrical contact members.

4. In a switchgear structure, in combination, a metal enclosed housing, said housing having rails disposed horizontally therein, a base comprising an inclined top and depending sides formed integrally therewith, rollers attached to the sides for movably supporting the base on the rails, a stationary contact member disposed in the housing a predetermined distance above the top of said base, a generally rectangularly shaped supporting member mounted on the inclined top of the base for supporting an electrical device, an electrical contact member carried by said supporting member, said contact member on the supporting member being on a level with the stationary contact member in the housing, and a pair of horizontally disposed spaced bars secured in the housing for adjustably supporting the stationary contact member.

5. In a switchgear structure, in combination, a metal enclosed housing, said housing having rails disposed horizontally therein, a base comprising an inclined top and depending sides formed integrally therewith, rollers attached to the sides for movably supporting the base on the rails, a stationary contact member disposed in the housing a predetermined distance above the top of said base, a generally rectangularly shaped supporting member mounted on the inclined top of the base for supporting an electrical device, an electrical contact member carried by said supporting member, said contact member on the supporting member being on a level with the stationary contact member in the housing, a pair of horizontally disposed spaced bars secured in the housing for adjustably supporting the stationary contact member, and an insulating barrier adjustably supported by said bars.

6. In a switchgear structure, in combination, a housing having rails disposed horizontally therein, a base comprising an inclined top and depending sides formed integrally therewith, rollers attached to the sides for movably supporting the base on the rails, a stationary contact member disposed in the housing a predetermined distance above the top of said base, a supporting member mounted on the inclined top of the base for supporting an electrical device, an electrical contact member carried by said supporting member, said contact member on the supporting member being on a level with the stationary contact member in the housing, a pair of horizontally disposed spaced bars secured in the housing for adjustably supporting the stationary contact member, an insulating barrier adjustably supported by said bars, and a grounding contact bar disposed in the line of movement of the electrical contact members.

7. In a switchgear structure, in combination, a housing having rails disposed horizontally therein, a base comprising an inclined top and depending sides formed integrally therewith, rollers attached to the sides for movably supporting the base on the rails, a stationary contact member disposed in the housing a predetermined distance above the top of said base, a supporting member mounted on the inclined top of the base for supporting an electrical device, an electrical contact member carried by said supporting member, said contact member on the supporting member being on a level with the stationary contact member in the housing, a pair of horizontally disposed spaced bars secured in the housing for adjustably supporting the stationary contact member, an insulating barrier adjustably supported by said bars, and a grounding contact bar disposed in the line of movement of the electrical contact members, said grounding contact bar also supporting said barrier.

8. In a switchgear structure, in combination, a housing having rails disposed horizontally therein, a base comprising an inclined top and depending sides formed integrally therewith, rollers attached to the sides for movably supporting the base on the rails, a stationary contact member disposed in the housing a predetermined distance above the top of said base, a supporting member mounted on the inclined top of the base for supporting an electrical device, an electrical contact member carried by said supporting member, said contact member on the supporting member being on a level with the stationary contact member in the housing, a pair of horizontally disposed spaced bars secured in the housing for adjustably supporting the stationary contact member, an insulating barrier adjustably supported by said bars, a grounding contact bar disposed in the line of movement of the electrical contact members, said grounding contact bar also supporting said barrier, and a grounding contact member in the housing for grounding said base.

References Cited in the file of this patent

UNITED STATES PATENTS

| Number | Name | Date |
|---|---|---|
| 783,377 | Jennison | Feb. 21, 1905 |
| 2,151,756 | Fletcher | Mar. 28, 1939 |
| 2,157,154 | Tweed | May 9, 1939 |
| 2,209,057 | Jackson | July 23, 1940 |
| 2,345,007 | Samzelius | Mar. 28, 1944 |
| 2,443,669 | Tusing | June 22, 1948 |
| 2,504,876 | Pringle | Apr. 18, 1950 |